(12) United States Patent
Herlambang et al.

(10) Patent No.: US 12,343,758 B2
(45) Date of Patent: Jul. 1, 2025

(54) RECORDING MEDIUM AND METHOD FOR PRODUCING RECORDED MATTER HAVING THREE-DIMENSIONAL IMAGE

(71) Applicant: CANON KABUSHIKI KAISHA, Tokyo (JP)

(72) Inventors: Olivia Herlambang, Kanagawa (JP); Toshihiro Omagari, Kanagawa (JP); Yoshiyuki Nagase, Kanagawa (JP); Tetsufumi Shiba, Kanagawa (JP); Takatoshi Tanaka, Tokyo (JP); Arika Tanaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/182,533

(22) Filed: Mar. 13, 2023

(65) Prior Publication Data

US 2023/0294129 A1     Sep. 21, 2023

(30) Foreign Application Priority Data

Mar. 16, 2022  (JP) .................................. 2022-041599
Mar. 10, 2023  (JP) .................................. 2023-037212

(51) Int. Cl.
*B05D 5/02*        (2006.01)
*B05D 3/02*        (2006.01)
(Continued)

(52) U.S. Cl.
CPC .............. *B05D 5/02* (2013.01); *B05D 3/0272* (2013.01); *B41F 23/04* (2013.01); *B41M 5/502* (2013.01); *C09K 23/018* (2022.01); *C09K 23/42* (2022.01)

(58) Field of Classification Search
CPC ...... B05D 3/0272; B05D 5/02; C09K 23/018; C09K 23/42; B41F 23/04; B41M 5/502;
(Continued)

(56) References Cited

U.S. PATENT DOCUMENTS 8,870,327 B2     10/2014  Kanamura et al.
2021/0402810 A1* 12/2021  Yamada ............... B41M 5/0041

FOREIGN PATENT DOCUMENTS

JP       10-129116 A      5/1998
JP       2012-171317 A    9/2012
(Continued)

OTHER PUBLICATIONS

Extended European Search Report in European Application No. 23162011.3 (Jul. 2023).

*Primary Examiner* — Michael G Miller
(74) *Attorney, Agent, or Firm* — Venable LLP (57) ABSTRACT

A recording medium for producing a recorded matter having a three-dimensional image comprises: a substrate; and a foaming layer being provided on the substrate and containing a foaming material which foams with heat and a binder resin. A contact angle of water to a surface of the foaming layer 30 seconds after the water is brought into contact with the surface of the foaming layer is 30° or more and 80° or less, and a ratio of a diameter of a water droplet 30 seconds after the water is brought into contact with the surface of the foaming layer to a diameter of the water droplet 0.01 seconds after the water is brought into contact with the surface of the foaming layer is 1.3 times or less.

18 Claims, 2 Drawing Sheets

(51) Int. Cl.
*B41F 23/04* (2006.01)
*B41M 5/50* (2006.01)
*C09K 23/00* (2022.01)
*C09K 23/42* (2022.01)

(58) Field of Classification Search
CPC .......... B41M 3/16; B41M 7/009; B41M 3/18; D06N 2209/083; D06N 3/0011; D06N 3/005; D06N 3/0068; D06N 3/042; D06N 3/14
See application file for complete search history.

(56) References Cited

FOREIGN PATENT DOCUMENTS

| | | |
|---|---|---|
| JP | 2020-114651 A | 7/2020 |
| JP | 2021-130218 A | 9/2021 |
| WO | 2022/107827 A1 | 5/2022 |

* cited by examiner

RECORDING MEDIUM AND METHOD FOR PRODUCING RECORDED MATTER HAVING THREE-DIMENSIONAL IMAGE

BACKGROUND OF THE INVENTION

Field of the Invention

The present invention relates to a recording medium and a method for producing a recorded matter having a three-dimensional image.

Description of the Related Art

As one of methods for forming a three-dimensional image, a method that uses a recording medium in which a thermal expansion sheet which foams and expands depending on absorbed heat amount is provided on one surface of a substrate is known. Specifically, after a light-absorbing pattern of a shaded image is formed in a thermal expansion sheet of this recording medium, the light-absorbing pattern is irradiated with light to generate heat depending on the shade of the image to cause the thermally expanding component to foam and expand to form a three-dimensional image (Japanese Patent Application Laid-Open No. 2012-171317).

In addition, a method has been proposed in which on a three-dimensional image forming layer of a recording component for forming a three-dimensional image in which the three-dimensional image forming layer containing foamable capsules is provided, a plasticizer for a shell wall resin of the foamable capsules are applied or printed, and then the foamable capsules are heated to foam to form a three-dimensional image (Japanese Patent Application Laid-Open No. H10-129116).

SUMMARY OF THE INVENTION

The present invention is directed to provide a recording medium that enables a three-dimensional image in which clear unevenness is expressed to be formed. In addition, the present invention is directed to provide a method for producing a recorded matter having a three-dimensional image in which clear unevenness is expressed.

One aspect of the present invention provides a recording medium comprising: a substrate; and a foaming layer being provided on the substrate and containing a foaming material which foams with heat and a binder resin, wherein a contact angle of water to a surface of the foaming layer 30 seconds after the water is brought into contact with the surface of the foaming layer is 30° or more and 80° or less, and a ratio of a diameter of a water droplet 30 seconds after the water is brought into contact with the surface of the foaming layer to a diameter of the water droplet 0.01 seconds after the water is brought into contact with the surface of the foaming layer is 1.3 times or less.

In addition, another aspect of the present invention provides a method for producing a recorded matter having a three-dimensional image, comprising the steps of: adding, to a recording medium including a substrate and a foaming layer being provided on the substrate and containing a foaming material which foams with heat and a binder resin, a foam-promoting liquid containing a foam-promoting component which reduces a foaming start temperature of the foaming material and water; and heating the foaming layer of the recording medium to which the foam-promoting liquid is added to cause the foaming material to foam, forming the three-dimensional image, wherein a contact angle of water to a surface of the foaming layer 30 seconds after the water is brought into contact with the surface of the foaming layer is 30° or more and 80° or less, and a ratio of a diameter of a water droplet 30 seconds after the water is brought into contact with the surface of the foaming layer to a diameter of the water droplet 0.01 seconds after the water is brought into contact with the surface of the foaming layer is 1.3 times or less.

Further features of the present invention will become apparent from the following description of exemplary embodiments with reference to the attached drawings.

DESCRIPTION OF THE EMBODIMENTS

Hereinafter, the present invention will be described in detail by presenting a preferred embodiment. Physical property values are values at ordinary temperature (25° C.) unless otherwise noted.

In the method proposed in Japanese Patent Application Laid-Open No. 2012-171317, in a case where a black ink or the like is printed on a heat absorbing portion, a color image is printed after the heat absorbing portion is foamed and expanded to be raised. For this reason, it is necessary to print the color image after a solid white image is printed on the entire surface of a recording medium. On the other hand, in the method proposed in Japanese Patent Application Laid-Open No. H10-129116, since a transparent plasticizer is applied, there is no need to print a solid white image like the method proposed in Japanese Patent Application Laid-Open No. 2012-171317, and a three-dimensional image can be efficiently formed. However, there is still room for improvement in the unevenness of the three-dimensional image to be formed.

Hence, the present inventors earnestly studied a recording medium which makes it possible to form a three-dimensional image in which clear unevenness is expressed, and a method for producing a recorded matter having a three-dimensional image in which clear unevenness is expressed, and completed the present invention.

<Recording Medium>

In a case where a three-dimensional image is to be formed by promoting the foamability of a foaming material by using a foam-promoting liquid containing a foam-promoting component, it is necessary to make the foam-promoting liquid present near the foaming material.

Then, to make the foam-promoting liquid present near the foaming material, it is important to make the foam-promoting liquid permeate in the depth direction of a foaming layer. As a result of the study, the present inventors found that it is possible to efficiently make an aqueous foam-promoting liquid containing water permeate in the depth direction of a foaming layer by satisfying the following requirements (i) and (ii), and completed the present invention.

(i) A contact angle of water to a surface of a foaming layer 30 seconds after the water is brought into contact with the surface of the foaming layer is 30° or more and 80° or less.

(ii) A ratio of a diameter of a water droplet 30 second after the water is brought into contact with the surface of the foaming layer to a diameter of the water droplet 0.01 seconds after the water is brought into contact with the surface of the foaming layer is 1.3 times or less.

If the ratio of the diameter of the water droplet 30 seconds after the water is brought into contact with the surface of the foaming layer to the diameter of the water droplet 0.01 seconds after the water is brought into contact with the surface of the foaming layer is more than 1.3 times, the aqueous foam-promoting liquid excessively wets and spreads on the surface of the foaming layer. This makes the aqueous foam-promoting liquid likely to spread in a lateral direction of the foaming layer rather than in the depth direction of the foaming layer, affecting the clearness of the three-dimensional image to be formed. That is, it is important to make the foam-promoting liquid permeate preferentially in the depth direction of the foaming layer while suppressing the wetting and spreading in the lateral direction of the foaming layer.

In addition, if the contact angle of the water to the surface of the foaming layer 30 seconds after the water is brought into contact with the surface of the foaming layer is more than 80°, the permeation speed of the foam-promoting liquid into the foaming layer becomes so slow that the foam-promoting liquid is unlikely to permeate into the lower portion of the foaming layer. In a case where it is necessary to form a three-dimensional image at a higher speed, the permeability of the foam-promoting liquid into the foaming layer is important. On the other hand, if the contact angle of the water to the surface of the foaming layer 30 seconds after the water is brought into contact with the surface of the foaming layer is less than 30°, the permeation speed of the foam-promoting liquid into the foaming layer becomes too fast. For this reason, the foam-promoting liquid permeates through the foaming layer before the foam-promoting component interacts with the foaming material to sufficiently promote the foamability of the foaming material. Hence, the foamability of the foaming material present near the surface of the foaming layer particularly becomes likely to decrease, making it difficult to express clear unevenness. Preferably, the contact angle of water to the surface of the foaming layer 30 seconds after the water is brought into contact with the surface of the foaming layer is 30° or more and 75° or less.

Figure 1:
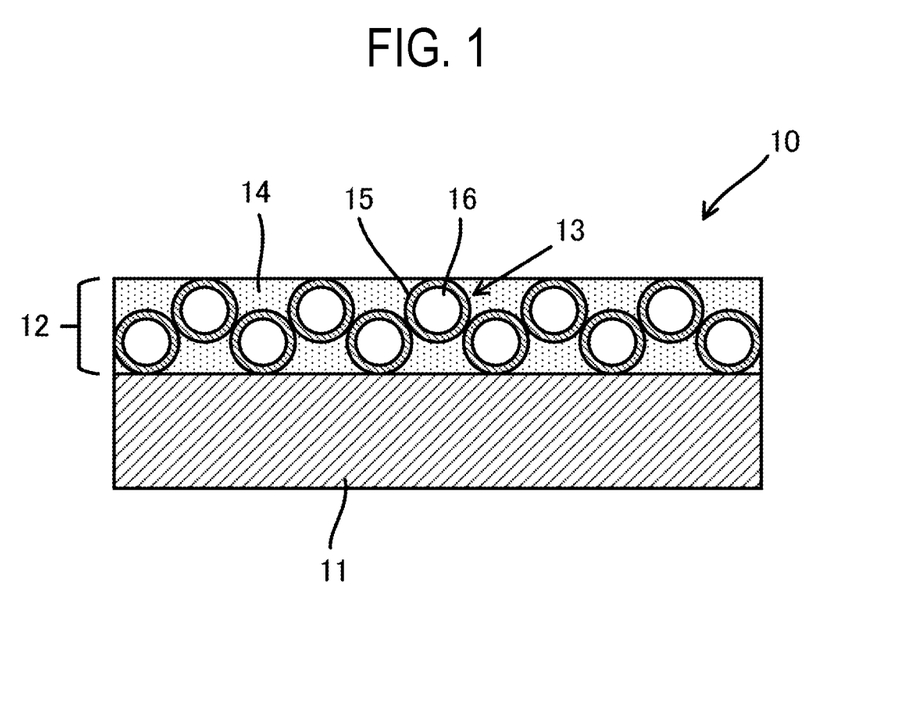
FIG. 1 is a cross-sectional view schematically showing an example of a recording medium of the present invention.

FIG. 1 is a cross-sectional view schematically showing an example of a recording medium used in the method for producing a recorded matter having a three-dimensional image of the present invention. As shown in FIG. 1, a recording medium 10 includes: a substrate 11; and a foaming layer 12 being provided on the substrate 11 and containing a foaming material such as foaming particles 13 which foams with heat. Hereinafter, the recording medium of the present invention will be described in detail.

(Substrate)

The substrate 11 functions as a support for supporting the foaming layer 12 (FIG. 1). The type of the substrate is not particularly limited. The substrate includes, for example, common paper made of natural pulp; kenaf paper; plastic film sheets of polypropylene, polyethylene, polyester, and the like; so-called synthetic paper and nonwoven fabric obtained by making synthetic fiber, synthetic pulp, and synthetic resin film into pseudo-paper; and the like.

(Foaming Layer)

[Foaming Material]

As shown in FIG. 1, the foaming layer 12 is a layer being provided on at least one surface of the substrate 11 and containing a foaming material such as the foaming particles 13 and a binder resin 14. As the foaming material, a chemical foaming material or a foaming material of microcapsule type (foaming particles 13) can be used. Among these, a foaming material of microcapsule type (foaming particles 13) is preferable. The foaming particle 13, and is also called a thermal expansion foaming material of microcapsule type, includes: a shell layer 15 containing a thermoplastic resin; and a volatile material 16 encapsulated in the shell layer 15. When heat is applied to this foaming particle 13, the thermoplastic resin contained in the shell layer 15 is softened and the volatile material 16 encapsulated in the shell layer 15 is vaporized, so that the volume is expanded. Hence, the foaming particle 13 is expanded like a balloon.

The thermoplastic resin contained in the shell layers includes, for example, polystyrene, styrene-acrylic acid ester copolymer, polyamide resin, polyacrylic acid ester, polyvinylidene chloride, polyacrylonitrile, polymethyl methacrylate, vinylidene chloride-acrylonitrile copolymer, methacrylic acid ester-acrylic acid copolymer, vinylidene chloride-acrylic acid copolymer, vinylidene chloride-acrylic acid ester copolymer, and the like. Among these, the thermoplastic resin is preferably polyacrylonitrile.

The volatile material includes, for example, low molecular weight hydrocarbons such as ethane, ethylene, propane, propene, n-butane, isobutane, n-pentane, isopentane, neopentane, n-hexane, heptane, and petroleum ether; chlorofluorocarbons such as $CCl_3F$, $CCl_2F_2$, $CClF_3$, and $CClF_2$—$CClF_2$; tetraalkylsilanes such as tetramethylsilane, trimethylethylsilane, trimethylisopropylsilane, and trimethyl-n-propyl silane; and the like. Among these, the volatile material is preferably a hydrocarbon having a molecular weight of 120 or less. In addition, the lower limit of the molecular weight of the volatile material (hydrocarbon) is not particularly limited, but, for example, is preferably 50 or more. Among these, the volatile material is preferably isobutane from the viewpoint of foamability. The content of the foaming particles in the foaming layer is preferably 5% by mass or more and 95% by mass or less based on the total mass of the foaming layer.

The foaming start temperature of the foaming material is preferably 80° C. or more and 100° C. or less. When a recording medium is normally produced, a coating liquid containing a foaming material is applied onto a substrate, and then the coating liquid is dried to form a foaming layer. If the foaming start temperature of the foaming material is less than 80° C., since it is necessary to set the temperature to dry the coating liquid to a temperature lower than the foaming start temperature, the productivity of the recording medium slightly decreases in some cases. On the other hand, if the foaming start temperature of the foaming material is more than 100° C., since the heating temperature to form a three-dimensional image becomes high, an excessive thermal energy is necessary in some cases.

[Binder Resin]

The foaming layer 12 contains the binder resin 14 in order to enhance adhesion with the substrate 11 (FIG. 1). When the foaming material in the foaming layer foams with heat, the binder resin plays an important role in suppressing the peeling of the foaming layer from the substrate. As the binder resin, a water-insoluble resin is preferably used. When the binder resin contains a water-insoluble resin, the binder resin becomes unlikely to be dissolved in water in the foam-promoting liquid as well, thus making it possible to suppress a decrease in the adhesion between the foaming layer and the substrate, which is caused by the foam-promoting liquid. Moreover, even when an aqueous ink containing water is added to the recording medium, it is possible to suppress a decrease in the adhesion between the foaming layer and the substrate for the same reason. Here, the water-insoluble resin refers to a resin 95% by mass or more of which remains in a case where the resin is immersed in warm water of 80° C. for 2 hours.

The binder resin is preferably at least one water-insoluble resin selected from the group consisting of acrylic resins, urethane resins, and polyacrylonitrile resins. In addition, the water-insoluble resin is preferably a non-absorbable resin. The foaming layer may contain a water-soluble resin together with a water-insoluble resin as long as the advantageous effect of the present invention can be achieved.

When the water-insoluble resin is normally produced, a dispersible emulsion is prepared by using a water-soluble resin such as polyvinyl alcohol and a surfactant while polymerizing a monomer in water. Then, there is a case where the water-soluble resin and the surfactant used as dispersants in the production of the water-insoluble resin affect the water permeability of the foaming layer containing the water-insoluble resin. For this reason, it is necessary to select the type of water-insoluble resin as appropriate from the viewpoint of controlling properties such as the contact angle of the surface of the formed foaming layer to water and water wetting and spreading properties.

The glass transition temperature of the binder resin is lower than the foaming start temperature of the foaming material by preferably 70° C. or more and further preferably 80° C. or more. By using a binder resin having a glass transition temperature lower than the foaming start temperature of the foaming material by 70° C. or more, it is possible to suppress generation of defects such as one in which the foaming material becomes unlikely to foam. The glass transition temperature of the binder resin is preferably −10° C. or more and 10° C. or less.

The binder resin is preferably a resin which can be softened by the foam-promoting component in the foam-promoting liquid. By using a resin which is softened by the foam-promoting component as the binder resin, it is possible to improve the foamability because the binder resin in a portion to which the foam-promoting liquid is added is softened.

From the viewpoint of further improving the foamability of the foaming layer, the Martens hardness of the foaming layer as measured in compliance with ISO 14577 is preferably 15 N/mm$^2$ or less. The Martens hardness of the foaming layer varies depending on the properties of the binder resin to be contained in the foaming layer. For this reason, it is preferable to select the properties of the binder resin such that the Martens hardness of the foaming layer falls within an appropriate range.

From the viewpoint of further improving the foamability of the foaming layer, creep CIT1 of the foaming layer after an increase in load as measure under the following conditions is preferably 25 or more and 70 or less. The creep CIT1 of the foaming layer varies depending on the properties of the binder resin to be contained in the foaming layer as in the case of the aforementioned Martens hardness. For this reason, it is preferable to select the properties of the binder resin such that the creep CIT1 of the foaming layer falls within an appropriate range.

[Conditions]
Indentation force F: 3.0 μm/20 s
Creep time C: 20.0 s

The mass ratio between the foaming material and the binder resin is preferably such that foaming material:binder resin=5:95 to 90:10. By setting the mass ratio between the foaming material and the binder resin within the above-described range, it is possible to improve both the foamability of the foaming material and the binding property to the substrate by the binder resin. The foaming layer may further contain components such as a pigment, an antioxidant, a dye, and a surfactant as long as the foamability is not impaired.

The arithmetic average roughness Ra of the surface of the foaming layer is preferably 1.0 μm or more, and further preferably 1.6 μm or more. By setting the arithmetic average roughness Ra of the surface of the foaming layer to 1.0 μm or more, the surface of the foaming layer is provided with a sufficiently wide surface area, making it possible to enhance the permeability of the foam-promoting liquid.

(Method for Producing a Recording Medium)

In order to produce a recording medium, first a coating liquid for a foaming layer containing a foaming material and a binder resin is applied onto a surface of a substrate to form a coating layer. Subsequently, the recording medium can be obtained by drying the coating layer thus formed to form a foaming layer. To apply the coating liquid for the foaming layer onto the surface of the substrate, a publicly-known air knife coater, die coater, blade coater, gate roll coater, bar coater, rod coater, roll coater, gravure coater, curtain coater, or the like may be used. The method for drying the coating layer includes, for example, a method including blowing hot air. The drying conditions (temperature, air flow amount, time, and the like) may be set as appropriate depending on the type of the substrate, the composition of the coating liquid, and the like. However, the temperature at the time of drying needs to be lower than the foaming start temperature of the used foaming material. Incidentally, the contact angle of water to a surface of the foaming layer of the recording medium and the ratio of the diameter of a water drop 30 seconds after the water is brought into contact with the surface of the foaming layer to the diameter of the water drop 0.01 seconds after the water is brought into contact with the surface of the foaming layer can be controlled by adjusting the kind and amount of a binder resin contained in the foaming layer. Further, the contact angle of water and the ratio of the diameters of a water drop as mentioned above can also be controlled by adjusting the kind and amount of a surfactant to be added optionally to the foaming layer.

On one surface of the substrate, it is preferable to provide the foaming layer in 2 g/m$^2$ or more, and it is further preferable to provide the foaming layer in 20 g/m$^2$ or more. By providing the foaming layer in 2 g/m$^2$ or more, it is possible to further improve the foamability.

Among the surfaces of the substrate, on a surface opposite to the surface on which the foaming layer is provided, a back coating layer may be provided. The back coating layer may be a layer identical to the foaming layer containing the foaming material, or may be a layer different from the foaming layer. In addition, an adhesive layer containing an adhesive resin such as an acrylic resin and an ink receiving layer for fixing a color material may be formed.

<Method for Producing a Recorded Matter>

By using the aforementioned recording medium, it is possible to produce a recorded matter having a three-dimensional image in which clear unevenness is expressed. Specifically, a method for producing a recorded matter having a three-dimensional image of the present invention comprises the steps of: adding a foam-promoting liquid to the above-mentioned recording medium; and heating the foaming layer of the recording medium to which the foam-promoting liquid is added to cause a foaming material to foam, forming a three-dimensional image. In addition, the foam-promoting liquid contains a foam-promoting component which reduces a foaming start temperature of the foaming material and water.

A heating device for heating the foaming layer of the recording medium to a desired temperature includes, for example, a dryer, an oven, a heater, an iron, and the like.
(Foam-Promoting Liquid)

The foam-promoting liquid is a liquid composition containing a foam-promoting component which reduces the foaming start temperature of a foaming material and water.
[Foam-Promoting Component]

The foam-promoting liquid contains a foam-promoting component which reduces the foaming start temperature of a foaming material such as foaming particles. By applying the foam-promoting liquid containing the foam-promoting component to a foaming layer of a recording medium by a method such as ejection using an inkjet system or application, the thermoplastic resin contained in the shell layers of the foaming particles can be softened. It is surmised that as a result, the foaming start temperature of the foaming particles can be shifted to a low-temperature side.

The foam-promoting component only has to be an component that is capable of softening the thermoplastic resin contained in the shell layers of the foaming particles, and may be selected and used as appropriate depending on the type of the thermoplastic resin, and the like. Particularly, the foam-promoting component is preferably a compound having no hydroxyl group. The boiling point of a compound having no hydroxyl group, which is used as the foam-promoting component, is higher than the temperature at which the foaming layer is heated. For this reason, even when the foaming layer is heated, the compound having no hydroxyl group is unlikely to be vaporized, and can thus contribute to the softening of the thermoplastic resin of the shell layers. The content of the compound having no hydroxyl group, which is used as the foam-promoting component, is preferably 10% by mass or more and 70% by mass or less based on the total mass of the foam-promoting liquid.

The absolute value ($|SP_1-SP_2|$) of a difference between the solubility parameter ($SP_1$) of the resin forming the shell layers of the foaming particles (microcapsules) and the solubility parameter ($SP_2$) of the foam-promoting component is preferably 3.5 or less. When the absolute value of the difference in solubility parameter is within the above-described numerical range, it is possible to further improve the foamability of the region to which the foam-promoting liquid containing the foam-promoting component is added in the foaming layer. The foam-promoting component includes, for example, 2-pyrrolidone, dimethyl sulfoxide, N,N-dimethylformamide, N-methyl-2-pyrrolidone, and the like.

The absolute value ($|HSP_1-HSP_2|$) of a difference between the Hansen solubility parameter ($HSP_1$) of the resin forming the shell layers of the foaming particles (microcapsules) and the Hansen solubility parameter ($HSP_2$) of the foam-promoting component is preferably 20 or less. When the absolute value of the difference in Hansen solubility parameter is within the above-described numerical range, it is possible to further improve the foamability of the region to which the foam-promoting liquid containing the foam-promoting component is added in the foaming layer.

The solubility parameters (SP values) of the thermoplastic resin forming the shell layers and the foam-promoting component are both values calculated by calculation. In addition, the Hansen solubility parameters (HSP values) of the thermoplastic resin forming the shell layers and the foam-promoting component are both actual measured values measured and calculated by dynamic light scattering.
[Other Components]

In the case where the foam-promoting component is a liquid at ordinary temperature (25° C.), the foam-promoting component itself may be used as a foam-promoting liquid. In addition, the foam-promoting liquid may further contain components other than the foam-promoting component (other components). For example, in order to improve the ejection stability of the foam-promoting liquid, it is preferable that a liquid component such as a solvent be further contained. As the solvent, water and various water-soluble organic solvents can be used. As the water, deionized water (ion-exchange water) is preferably used. In particular, the foam-promoting liquid is preferably an aqueous foam-promoting liquid containing water. The water-soluble organic solvents include alcohols, glycols, glycol ethers, nitrogen-containing compounds, and the like.

As the other components other than the liquid component, urea and derivatives thereof, water-soluble organic compounds such as trimethylolpropane and trimethylolethane which are solids at a temperature of 25° C. may be used. Furthermore, various additives such as a pH adjuster, an antifoam, a corrosion inhibitor, an antiseptic, a fungicide, an antioxidant, a reduction inhibitor, and a chelating agent may be contained in the foam-promoting liquid as necessary.
<Device for Producing a Recorded Matter Having Three-Dimensional Image>

A device for producing a recorded matter having a three-dimensional image (hereinafter, also referred to simply as the "device for producing a recorded matter") includes: foam-promoting liquid adding means for adding a foam-promoting liquid to a recording medium; and heating means for heating a foaming layer of the recording medium to which the foam-promoting liquid is added. The recording medium includes: a substrate; and a foaming layer being provided on the substrate and containing a foaming material which foams with heat and a binder resin. The foam-promoting liquid contains a foam-promoting component which reduces a foaming start temperature of the foaming particles and water. The heating means is means for heating the foaming layer of the recording medium to cause the foaming particles to foam, forming a three-dimensional image. This device for producing a recorded matter can be favorably used in the aforementioned method for producing a recorded matter.

The device for producing a recorded matter may also include: an ink container which holds an ink; and ink adding means for ejecting the ink from an inkjet recording head to record an image on a recording medium. In addition, the device for producing a recorded matter may also include a foam-promoting liquid container which holds the foam-promoting liquid. Furthermore, the device for producing a recorded matter may also include transporting means for transporting the recording medium.

The arrangement of the foam-promoting liquid adding means, the ink adding means, and the heating means can be adjusted as appropriate. Hereinafter, the arrangement of the foam-promoting liquid adding means, the ink adding means, and the heating means in the device for producing a recorded matter will be described with reference to the drawing.

Figure 2A:
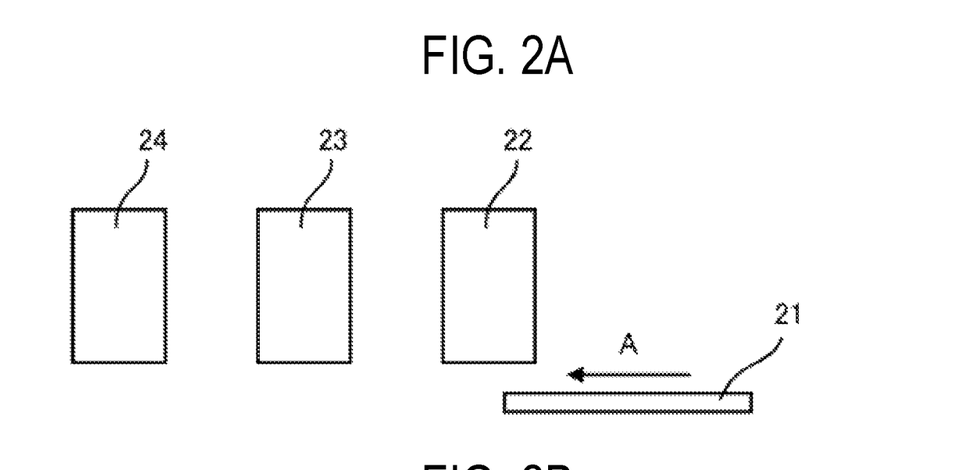
FIG. 2A, FIG. 2B, and FIG. 2C are schematic views showing schematic configurations of production devices of a recorded matter having a three-dimensional image.
Figure 2B:
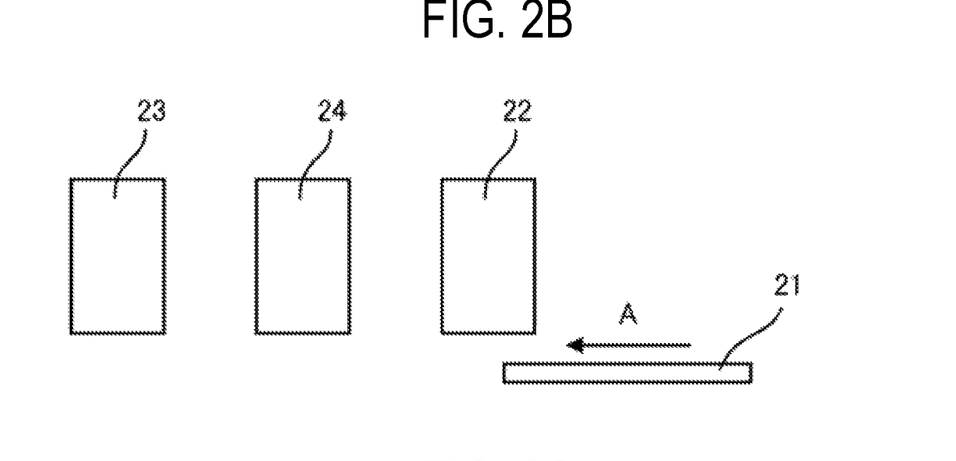
Figure 2C:
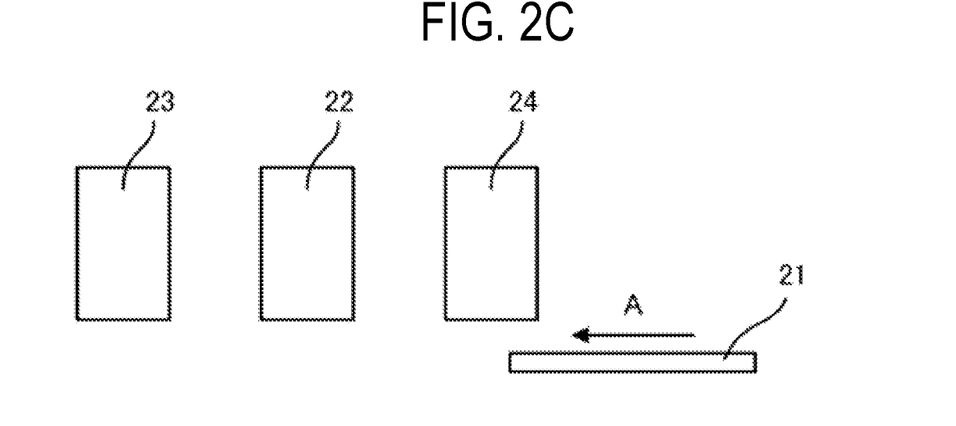

FIGS. 2A to 2C are schematic views showing schematic configurations of the device for producing a recorded matter having a three-dimensional image. In the production devices shown in FIGS. 2A to 2C, a recording medium 21 is transported in the direction of the arrow A by transporting means for transporting a recording medium. Ink adding means 24 may be arranged upstream or downstream of foam-promoting liquid adding means 22, and may be arranged upstream or downstream of heating means 23, in the direction A of transportation of the recording medium 21. FIG. 2A shows a configuration in which the ink adding means 24 is arranged downstream of the foam-promoting liquid adding means 22 and downstream of the heating means 23 in the direction A of transportation of the recording medium 21. FIG. 2B shows a configuration in which the ink adding means 24 is arranged downstream of the foam-promoting liquid adding means 22 and upstream of the heating means 23 in the direction A of transportation of the recording medium 21. FIG. 2C shows a configuration in which the ink adding means 24 is arranged upstream of the foam-promoting liquid adding means 22 and upstream of the heating means 23 in the direction A of transportation of the recording medium 21.

The foam-promoting liquid can be applied onto the foaming layer of the recording medium 21 by ejecting the foam-promoting liquid from the recording head of inkjet system, which is included in the foam-promoting liquid adding means 22 arranged at a predetermined position in the direction of transportation of the recording medium 21 (the direction of the arrow A in FIGS. 2A to 2C). The heating means 23 is means for heating the foaming layer of the recording medium 21 onto which the foam-promoting liquid is added. The heating means 23 only has to be a heating device that can heat the foaming material in the foaming layer to a desired temperature. Such a heating device includes, for example, a dryer, an oven, a heater, an iron, and the like.

The present invention can provide a recording medium which makes it possible to form a three-dimensional image in which clear unevenness is expressed. In addition, the present invention can provide a method for producing a recorded matter having a three-dimensional image in which clear unevenness is expressed.

EXAMPLES

Hereinafter, the present invention will be described in further detail by giving Examples and Comparative Examples; however, the present invention is not limited to Examples described below at all without departing from the gist. The amounts of components described with "part" and "%" are in terms of mass unless otherwise noted.

<Preparation of Foaming Particles>

Foaming particles H1, H2, and H3 of types shown in Table 1 were prepared. Then, the foaming start temperature of each foaming particle was measured in the following procedure by using a thermo-mechanical analyzer (TMA) (trade name "TMA 2940", manufactured by TA instruments). In an aluminum container having a diameter of 7 mm and a depth of 1 mm, 25 μg of the sample was thrown in, and a load of 0.1 N was applied from above. In this state, the sample was heated from 60° C. to 200° C. at a heating rate of 5° C./min, and displacement in the vertical direction of the measuring terminal was measured. Then, the temperature at which the displacement started was measured as the "foaming start temperature". Results are shown in Table 1.

TABLE 1

| Foaming Particle | Product Name | Producer | Shell Layer | Volatile Material | Foaming Start Temperature (° C.) |
| --- | --- | --- | --- | --- | --- |
| H1 | Advancell EMH204 | SEKISUI CHEMICAL CO., LTD. | Polyacrylonitrile | Isopentane | 110 |
| H2 | Expancel 007-40 | Japan Fillite Co., Ltd. | Polyacrylonitrile | Isobutane | 91 |
| H3 | Matsumoto Microsphere F-30 | Matsumoto Yushi-Seiyaku Co., Ltd. | Polyvinylidene Chloride | Isobutane | 70 |

<Preparation of Binder Resins>

Binder resins B1 to B8 of types shown in Table 2 were prepared.

TABLE 2

| Binder resin | Product Name | Producer | Type of Resin | Glass Transition Temperature Tg (° C.) |
| --- | --- | --- | --- | --- |
| B1 | Mowinyl 7820 | Japan Coating Resin Corporation | Acrylic Resin | 4 |
| B2 | Mowinyl 6950 | Japan Coating Resin Corporation | Acrylic Resin | 0 |
| B3 | SUPERFLEX 620 | DKS Co., Ltd. | Urethane Resin | 43 |
| B4 | P30T | Shaoxing Gimel Advanced Materials Technology | Polyacrylonitrile Resin | 104 |
| B5 | K-90 | BASF | Polyvinylpyrrolidone | 87 |
| B6 | PVA235 | Kuraray Co., Ltd. | Polyvinyl Alcohol Resin | 70 |

TABLE 2-continued

| Binder resin | Product Name | Producer | Type of Resin | Glass Transition Temperature Tg (° C.) |
|---|---|---|---|---|
| B7 | Mowinyl 6940 | Japan Coating Resin Corporation | Acrylic Resin | 0 |
| B8 | TEISANRESIN PT-850 | Nagase ChemteX Corporation | Acrylate Ester | 6 |

<Preparation of Recording Media>
(Recording Medium 1)

As the substrate, polypropylene synthetic paper (trade name "New Yupo FGS110", manufactured by Yupo Corporation) was prepared. To ion-exchange water, 100 parts of the binder resin B2 and 50 parts of the foaming particles H2 were added, followed by sufficiently stirring to obtain a coating liquid 1 having a solid component concentration of 43%. The obtained coating liquid 1 was applied onto the substrate such that the applied amount became 40 g/m², followed by drying in an oven of 80° C. for 5 minutes to form a foaming layer, thus obtaining a recording medium 1.
(Recording Media 2, 3, 6 to 9, 11 to 14, and 16)

Recording media 2, 3, 6 to 9, 11 to 14, and 16 were obtained in the same manner as in the aforementioned recording medium 1 except the blend and the drying temperature of the coating liquid were changed to those shown in Table 3.
(Recording Media 4 and 5)

Recording medium 4 was obtained in the same manner as in the aforementioned recording medium 1 except that the binder resin B1 was used instead of the binder resin B2 and that a surfactant (trade name "SURFYNOL® 465", produced by Nissin Chemical Industry Co., Ltd.) was added so as to be contained by 0.10% by mass based on the total mass of the coating liquid.

Also, recording media 5 was obtained in the same manner as in the aforementioned recording medium 4 except that a surfactant (trade name "SURFYNOL® 465", produced by Nissin Chemical Industry Co., Ltd.) was added so as to be contained by 0.05% by mass based on the total mass of the coating liquid.
(Recording Medium 10)

Recording medium 10 was obtained by producing a recording medium in the same manner as in the aforementioned recording medium 1 and calendering the thus obtained recording medium.
(Recording Medium 15)

Paper having a heat-raisable surface (trade name "Zytex2", produced by Zychem) was used as recording medium 15.

TABLE 3

| Recording Medium | Binder Resin | | Foaming Particles | | Drying Temperature of Coating Liquid (° C.) |
|---|---|---|---|---|---|
| | Type | Amount (Parts) | Type | Amount (Parts) | |
| 1 | B2 | 100 | H2 | 50 | 80 |
| 2 | B1/B6 | 80/20 | H2 | 50 | 80 |
| 3 | B1/B6 | 30/70 | H2 | 50 | 80 |
| 4 | B1 | 100 | H2 | 50 | 80 |
| 5 | B1 | 100 | H2 | 50 | 80 |
| 6 | B5 | 100 | H2 | 50 | 80 |
| 7 | B3 | 100 | H2 | 50 | 80 |
| 8 | B4 | 100 | H1 | 50 | 105 |
| 9 | B2 | 100 | H1 | 50 | 80 |
| 10 | B2 | 100 | H2 | 50 | 80 |
| 11 | B2/B7 | 85/15 | H2 | 50 | 80 |
| 12 | B2/B7 | 70/30 | H2 | 50 | 80 |
| 13 | B2/B7 | 60/40 | H2 | 50 | 80 |
| 14 | B7 | 100 | H2 | 50 | 80 |
| 15 | | | Zytex2 | | |
| 16 | B8 | 100 | H3 | 25 | 65 |

<Measurement of Physical Properties of Recording Medium>
(Contact Angle)

First, 4.0 µL of water was brought into contact with the surface of the foaming layer of the recording medium. Then, the contact angle between the surface of the foaming layer and the water was measured 30 seconds after the water was brought into contact by using a contact angle goniometer (trade name "1100DAT", manufactured by FIBRO). Results are shown in Table 4.
(Dot Diameter of Water)

First, 4.0 µL of water was brought into contact with the surface of the foaming layer of the recording medium. Then, the diameter ($D_1$ (µm)) and the diameter ($D_2$ (µm)) of the water droplet, respectively 0.01 seconds and 30 seconds after the water was brought into contact were measured by using the contact angle goniometer (trade name "1100DAT", manufactured by FIBRO), and the value of $D_2/D_1$ (times) was calculated. Results are shown in Table 4.
(Arithmetic Average Roughness Ra)

The arithmetic average roughness Ra of the surface of the foaming layer of the recording medium was measured under the following conditions in compliance with ISO 4287:1997. Results are shown in Table 4.

Measuring device: trade name "Surfcorder SE3500", manufactured by Kosaka Laboratory Ltd.
  Cutoff value: 0.8 mm
  Evaluation length: 5 times the cutoff value
(Martens Hardness and Creep CIT1)

The Martens hardness (N/mm²) and the creep CIT1 of the foaming layer of the recording medium were measured under the following conditions by using a microhardness test instrument (trade name "PICODENTOR HM500", manufactured by Fischer Instruments K. K.) in compliance with ISO 14577. Results are shown in Table 4. The Martens hardness is a load required to form an indentation having a certain depth by indenting a measurement target with an indenter, and is a physical property value that gives an indication showing the degree of hardness of the measurement target. In addition, the creep CIT1 is a parameter representing a change in indentation depth when creep is applied with a certain test load for a certain period of time.

Indentation force F: 3.0 μm/20 s
Creep time C: 20.0 s

TABLE 4

| Recording Medium | Contact Angle (°) | Value of $D_2/D_1$ (times) | Arithmetic Average Roughness Ra (μm) | Martens Hardness (N/mm$^2$) | Creep CIT1 |
|---|---|---|---|---|---|
| 1  | 38 | 1.2 | 1.8 | 12 | 35 |
| 2  | 61 | 1.2 | 1.5 | 14 | 37 |
| 3  | 25 | 1.3 | 1.8 | 14 | 35 |
| 4  | 25 | 1.4 | 1.8 | 14 | 35 |
| 5  | 30 | 1.3 | 1.8 | 14 | 35 |
| 6  | 0  | 1.6 | 1.8 | 14 | 35 |
| 7  | 50 | 1.1 | 1.8 | 58 | 20 |
| 8  | 65 | 1.1 | 1.8 | 30 | 20 |
| 9  | 40 | 1.2 | 1.8 | 12 | 35 |
| 10 | 40 | 1.3 | 0.9 | 12 | 35 |
| 11 | 71 | 1.3 | 1.7 | 12 | 35 |
| 12 | 78 | 1.3 | 1.7 | 12 | 35 |
| 13 | 82 | 1.3 | 1.7 | 12 | 35 |
| 14 | 90 | 1.4 | 1.7 | 12 | 35 |
| 15 | 30 | 1.5 | 1.7 | 22 | 22 |
| 16 | 82 | 1.1 | 1.8 | 12 | 35 |

<Preparation of Foam-Promoting Liquid>
(Foam-Promoting Liquid 1)

First, 30 parts of dimethyl sulfoxide, 0.5 parts of nonionic surfactant (trade name "Acetylenol E100", produced by Kawaken Fine Chemicals Co., Ltd.), and 69.5 parts of ion-exchange water were mixed. After sufficient stirring, the mixture was filtrated under pressure with a filter having a pore size of 1.2 μm to obtain a foam-promoting liquid 1.

(Foam-Promoting Liquid 2)

First, 30 parts of propylene glycol monomethyl ether, 0.5 parts of nonionic surfactant (trade name "Acetylenol E100", produced by Kawaken Fine Chemicals Co., Ltd.), and 69.5 parts of ion-exchange water were mixed. After sufficient stirring, the mixture was filtrated with pressure with a filter having a pore size of 1.2 μm to obtain a foam-promoting liquid 2.

<Production of Recorded Matter>

Cartridges were filled with the foam-promoting liquids 1 and 2, respectively, and were attached to an inkjet recording device (trade name "PIXUS MG3630", manufactured by Canon Inc.). In the present Examples, the recording duty of an image recorded under conditions that two ink droplets of about 11.2 ng each are applied to a unit region of 1/600 inches×1/600 inches is defined to be 100%.

Example 1

The foam-promoting liquid 1 was applied onto the foaming layer of the recording medium 1 such that the recording duty became 100% by using the above-described inkjet recording device. The foaming layer to which the foam-promoting liquid 1 was applied was heated for 30 seconds such that the surface temperature became 85° C. by using a hot air gun (trade name "HL2010E1", manufactured by SAKAGUCHI E.H VOC CORP.) 15 seconds after the foam-promoting liquid 1 was applied. In this way, the foaming particles H2 in the foaming layer to which the foam-promoting liquid 1 was applied were cause to foam to form a three-dimensional image, thus obtaining a recorded matter 1.

Examples 2 to 9, Comparative Examples 1 to 7

Recorded matters 2 to 16 were obtained in the same manner as in the aforementioned Example 1 except that recording media and foam-promoting liquids of types shown in Table 5 were used and the heating conditions were changed to those shown in Table 5.

<Evaluation>
(Foaming Height)

The height (foaming height) of a foamed portion based on the height of an unfoamed portion on the surface of the obtained recorded matter was measured by using a digital micrometer (trade name "M-30", manufactured by Sony). Results are shown in Table 5.

A: The foaming height was 200 μm or more.
B: The foaming height was 100 μm or more and less than 200 μm.
C: The foaming height was less than 100 μm.

(Peeling from Substrate of Foaming Layer)

The surfaces of the obtained recorded matters were visually observed, and the peeling from the substrates of the foaming layers was evaluated in accordance with the evaluation criteria shown below. Results are shown in Table 5.

A: Peeling from the substrate of the foaming layer was not observed.
C: Peeling from the substrate of the foaming layer was observed.

TABLE 5

| | Recorded Matter | Recording Medium | Foam-promoting Liquid | Heating Conditions Temperature (° C.) | Time (sec) | Foaming Height | Peeling from Substrate |
|---|---|---|---|---|---|---|---|
| Example 1 | 1 | 1 | 1 | 90 | 30 | A | A |
| Example 2 | 2 | 2 | 1 | 90 | 30 | A | A |
| Comparative Example 1 | 3 | 3 | 1 | 90 | 30 | C | A |
| Comparative Example 2 | 4 | 4 | 1 | 90 | 30 | C | A |
| Example 3 | 5 | 5 | 1 | 90 | 30 | B | A |
| Comparative Example 3 | 6 | 6 | 1 | 85 | 30 | A | C |
| Example 4 | 7 | 7 | 1 | 90 | 30 | B | A |
| Example 5 | 8 | 8 | 1 | 105 | 30 | B | A |
| Example 6 | 9 | 9 | 1 | 105 | 30 | A | A |
| Example 7 | 10 | 10 | 1 | 90 | 30 | B | A |
| Example 8 | 11 | 11 | 1 | 90 | 30 | A | A |
| Example 9 | 12 | 12 | 1 | 90 | 30 | B | A |

TABLE 5-continued

|  | Recorded Matter | Recording Medium | Foam-promoting Liquid | Heating Conditions Temperature (° C.) | Time (sec) | Foaming Height | Peeling from Substrate |
|---|---|---|---|---|---|---|---|
| Comparative Example 4 | 13 | 13 | 1 | 90 | 30 | C | A |
| Comparative Example 5 | 14 | 14 | 1 | 90 | 30 | C | A |
| Comparative Example 6 | 15 | 15 | 1 | 97 | 30 | C | A |
| Comparative Example 7 | 16 | 16 | 2 | 120 | 3 | C | A |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-041599, filed Mar. 16, 2022, and Japanese Patent Application No. 2023-037212, filed Mar. 10, 2023 which are hereby incorporated by reference herein in their entirety.

What is claimed is:

1. A recording medium comprising:
 a substrate; and
 a foaming layer on the substrate and comprising a foaming material which foams with heat, and a binder resin,
 wherein a contact angle of water to a surface of the foaming layer 30 seconds after the water is brought into contact with the surface of the foaming layer is 30° to 80°, and
 a ratio of a diameter of a water droplet 30 seconds after the water is brought into contact with the surface of the foaming layer to a diameter of the water droplet 0.01 seconds after the water is brought into contact with the surface of the foaming layer is 1.3 times or less.

2. The recording medium according to claim 1, wherein the foaming material is a foaming particle including: a shell layer containing a thermoplastic resin; and a volatile material encapsulated in the shell layer.

3. The recording medium according to claim 2, wherein the thermoplastic resin is polyacrylonitrile, and the volatile material is isobutane.

4. The recording medium according to claim 1, wherein the binder resin is at least one selected from the group consisting of acrylic resins, urethane resins, and polyacrylonitrile resins.

5. The recording medium according to claim 1, wherein a glass transition temperature of the binder resin is lower than a foaming start temperature of the foaming material by 70° C. or more.

6. The recording medium according to claim 1, wherein a foaming start temperature of the foaming material is 80° C. to 100° C.

7. The recording medium according to claim 1, wherein a glass transition temperature of the binder resin is −10° C. to 10° C.

8. The recording medium according to claim 1, wherein an arithmetic average roughness Ra of the surface of the foaming layer is 1.0 μm or more.

9. The recording medium according to claim 1, wherein a Martens hardness of the foaming layer is 15 N/mm$^2$ or less.

10. The recording medium according to claim 1, wherein a creep CIT1 of the foaming layer after an increase in load as measured under following conditions is 25 to 70:
 indentation force F: 3.0 μm/20 s
 creep time C: 20.0 s.

11. The recording medium according to claim 1, wherein the contact angle of the water to the surface of the foaming layer 30 seconds after the water is brought into contact with the surface of the foaming layer is 30° to 75°.

12. The recording medium according to claim 1, wherein the binder resin comprises a water-insoluble resin.

13. The recording medium according to claim 12, wherein the binder resin further comprises a water-soluble resin.

14. The recording medium according to claim 1, wherein the foaming layer further comprises a surfactant.

15. A method for producing a recorded matter having a three-dimensional image, comprising the steps of:
 adding, to a recording medium including a substrate and a foaming layer being provided on the substrate and containing a foaming material which foams with heat, and a binder resin, a foam-promoting liquid containing a foam-promoting component which reduces a foaming start temperature of the foaming material and water; and
 heating the foaming layer of the recording medium to which the foam-promoting liquid is added to cause the foaming material to foam, forming a three-dimensional image,
 wherein a contact angle of water to a surface of the foaming layer 30 seconds after the water is brought into contact with the surface of the foaming layer is 30° to 80°, and
 a ratio of a diameter of a water droplet 30 seconds after the water is brought into contact with the surface of the foaming layer to a diameter of the water droplet 0.01 seconds after the water is brought into contact with the surface of the foaming layer is 1.3 times or less.

16. The method according to claim 15, wherein the foam-promoting component is at least one selected from the group consisting of 2-pyrrolidone, dimethyl sulfoxide, N,N-dimethylformamide, and N-methyl-2-pyrrolidone.

17. The method according to claim 15, wherein the foam-promoting liquid is an aqueous foam-promoting liquid containing water.

18. The method according to claim 15, wherein the contact angle of the water to the surface of the foaming layer 30 seconds after the water is brought into contact with the surface of the foaming layer is 30° to 75°.

* * * * *